United States Patent [19]

Michaud-Soret

[11] Patent Number: 4,464,429

[45] Date of Patent: Aug. 7, 1984

[54] SEMI-FINISHED PRODUCT BASED ON FIBERS PREIMPREGNATED WITH POLYMERIZABLE RESIN

[75] Inventor: Jean A. Michaud-Soret, Paris, France

[73] Assignee: Societe Nationale Industrielle Aerospatiale, France

[21] Appl. No.: 435,499

[22] Filed: Oct. 20, 1982

[30] Foreign Application Priority Data

Oct. 20, 1981 [FR] France ............... 81 19706

[51] Int. Cl.³ ............................... B32B 3/12
[52] U.S. Cl. ................... 428/117; 428/118; 428/174; 428/182; 428/184; 428/186; 428/284; 428/285; 428/286; 428/294; 428/408; 428/902
[58] Field of Search ............... 428/292, 293, 294, 295, 428/68, 71, 408, 902, 174, 182, 184, 186, 117, 118, 284, 285, 286

[56] References Cited

U.S. PATENT DOCUMENTS

| | | | |
|---|---|---|---|
| 2,830,926 | 4/1958 | Bailey | 156/324 |
| 3,150,030 | 9/1964 | Mondano | 428/118 |
| 3,660,197 | 2/1972 | Morgan et al. | 428/293 |
| 3,756,905 | 9/1973 | Mills et al. | 428/294 |
| 3,983,282 | 9/1976 | Seemann | 428/294 |
| 4,051,289 | 9/1977 | Adamson | 428/174 |
| 4,079,568 | 3/1978 | Wortman | 428/294 |
| 4,086,378 | 4/1978 | Ham et al. | 428/117 |
| 4,090,002 | 5/1978 | Rosenblum | 428/118 |
| 4,135,029 | 1/1979 | Pfeffer | 428/294 |
| 4,177,306 | 12/1979 | Schulz et al. | 428/295 |

FOREIGN PATENT DOCUMENTS 2028715  3/1980  United Kingdom .

*Primary Examiner*—James J. Bell
*Attorney, Agent, or Firm*—McGlew and Tuttle

[57] ABSTRACT

The invention relates to a semi-finished product based on fibers preimpregnated with polymerizable resin, which is intended for the manufacture of components made of composite materials and having a variety of shapes, in particular long and/or thick components. This semi-finished product comprises at least one layer formed of a plane web of preimpregnated fabric and of a web of strips of preimpregnated rovings arranged in rows juxtaposed on the fabric in one and the same longitudinal direction. Another web of preimpregnated fabric is preferably provided. It passes alternately above and below the rows of strips. The fibers of the rovings and of the fabrics can be glass fibers, carbon fibers, boron fibers or Kevlar fibers.

5 Claims, 4 Drawing Figures

SEMI-FINISHED PRODUCT BASED ON FIBERS PREIMPREGNATED WITH POLYMERIZABLE RESIN

BACKGROUND OF THE INVENTION

In the construction of complex components made of fiber/resin composite materials, various individual elements are assembled, for example by gluing. It is possible for these elements to have undergone beforehand, for this purpose, a partial prepolymerization of their resin.

Threads, strips or fabrics are also assembled, while they are still wet, that is to say impregnated with unpolymerized resin, and the whole is then polymerized.

The latter process, which favors bonds of good quality, leads, in the case of large components, for example long and/or thick components, to numerous delicate manipulations. Such manipulations are required for the positioning of a large number of long strips of rovings, the faces of which are sticky and tacky. These manipulations lead to very long working times and to high investments in machines for dispensing rovings and in draping machines (the latter producing piles of textile webs), which are generally designed for only one type of operation, but sometimes for several types, in which case they are complex and expensive universal machines.

SUMMARY OF THE INVENTION

To overcome these disadvantages, the object of the present invention is to create an industrial semi-finished product which makes it possible to facilitate the production of components made of composite materials, this semi-finished product being in the form of panels or bands which have a much greater mass per unit length or per unit surface area than the customary strips of rovings, and the manufacture of which can be entirely mechanized.

The invention thus relates to a semi-finished product based on fibers preimpregnated with polymerizable resin, which is intended for the manufacture of components made of composite materials and having large dimensions and/or considerable thickness, and which comprises at least one layer formed of a plane base web of fabric preimpregnated with the unpolymerized or only partially polymerized resin and of a web of strips of rovings also preimpregnated with the unpolymerized or only partially polymerized resin and arranged in rows juxtaposed on the fabric in one and the same longitudinal direction. The strips of rovings provide the semi-finished product with a high longitudinal strength, while the fabric provides its transverse strength. Each row can comprise several superposed strips of preimpregnated rovings, kept in tacky condition, according to the desired thickness.

To improve the transverse strength of the semi-finished product, the abovementioned web of strips of rovings can be combined with another web of preimpregnated fabric, kept in tacky condition, having a rippled configuration and passing alternately above and below the juxtaposed rows of the web of strips. The web of strips of preimpregnated rovings can also be covered with a plane web of preimpregnated fabric, kept in tacky condition, on the face opposite the base web, which increases the rigidity of the semi-finished product.

If it is desired to produce a relatively thick component, it is possible to use a semi-finished product consisting of several superposed layers each having a structure conforming to one of those which have just been specified. In particular, the ordered stacking of layers comprising a fabric of rippled configuration can advantageously lead to a cellular structure. More generally, the orientation of the strips of rovings in the various webs can be either identical or different (for example in directions intersecting at 45° or 90°). The precise positioning of these constituents can be carried out mechanically by known processes, for example by means of banks of winders and pressure rollers.

The resin contained in a semi-finished product according to the invention is normally unpolymerized or only partially polymerized. For the purpose of storage, it should be covered on both faces with detachable protective sheets because the unpolymerized resin makes it sticky. For the working out of a structural component, the semi-finished product is subjected, after molding, to a polymerization treatment resulting in the finished component.

The impregnating resin in the semi-finished product can also be completely polymerized. In this case, the semi-finished product is in the form of a rigid construction element, for example in the form of a plane panel which can be used like a metal plate.

The fibers which make up the strips of rovings and the fabric or fabrics incorporated in the semi-finished product are preferably mineral fibers, such as glass, boron, carbon or "Kevlar" aromatic polyamide fibers. Although much more expensive than glass fibers, fibers composed of the last three substances make it possible to obtain more favourable ratios of mechanical characteristics to mass.

The use of the semi-finished product according to the invention, which briefly comprises a preassembly of strips of rovings and of at least one base fabric with impregnated resin, makes it possible to dispense with the long and difficult operations necessary hitherto for the positioning of numerous individual preimpregnated elements. This semi-finished product is easy to manipulate. It is scarcely more expensive than its constituent elements. It can be used either by itself or in combination with a bulk filler (sandwich structure). It makes it possible easily to produce, with a considerable saving in terms of time and money, the widest variety of components which are to have good mechanical properties and, possibly, large dimensions.

In the field of aeronautics, numerous structures, such as skins, spars, stringers, floors and helicopter hubs and blades, can be made from the semi-finished product according to the invention, together with windmill blades and, in shipbuilding, elements such as "foils", drop-keels, rudders, masts, rails, floats, hulls and hull reinforcement, and trimaran arms. In the field of mechanical construction and building, the semi-finished product makes it possible to manufacture various beams, sections for carpentry, safety barriers, roofing, scaffolding tubes or bridge elements, and also, in the field of motor car construction, structures and floors for lorries, chassis and suspensions.

The characteristics of the semi-finished product according to the invention, the case with which it is used and the possibility of producing it economically (for example from E-glass or R-glass) open up vast fields of application.

The description which now follows, with reference to the drawings attached by way of non-limiting examples, will provide a clear understanding of how the present invention can be put into practice.

DESCRIPTION OF THE PREFERRED EMBODIMENTS

In its simplest form (FIG. 1), a semi-finished product according to the invention comprises a web of base fabric 1 and rows 2 of strips of rovings 3, justaposed on the fabric 1 and orientated in one and the same longitudinal direction. In the present example, each row 2 is composed of two superposed strips 3.

Figure 1:
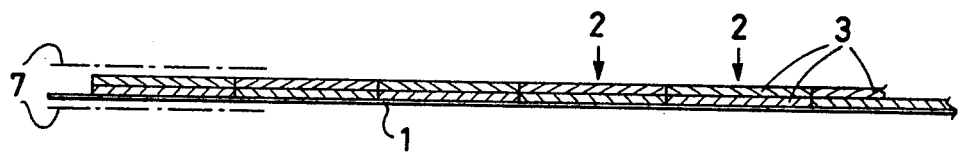
FIGS. 1 to 3 show, in cross-section, three embodiments of a semi-finished product according to the invention.
Figure 2:
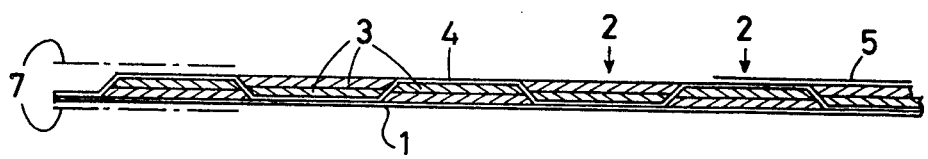

FIG. 2 shows a variant which incorporates another web of fabric 4. The latter is not plane but ripples by passing alternately below and above the rows 2 of strips 3. It does not prevent the semi-finished product from being able to be bent or folded without difficulty in the longitudinal direction. A third web of fabric 5 can also be provided, as shown in the right-hand part of FIG. 2, in order to cover all the rows 2 of strips 3, giving the semi-finished product a symmetrical structure. A web 5 of this type, which is plane like the base web 1 and may or may not be identical in nature to the latter, can also be provided in the case of the embodiment of FIG. 1. However, it increases the rigidity of the semi-finished product, whereby the asymmetrical structure (without the web 5) is preferable if it is desired to roll up the semi-finished product for the purpose of storage.

In practice, a semi-finished product according to FIG. 1 or 2 can be in the form of panels or bands having, for example, a thickness of 2 to 2.3 mm, depending on the resin impregnation level, a width of 25 cm, a theoretically unlimited length and a mass per square meter of 4 kg, that is to say a mass per unit length of 1 kg/m, which is to be compared with the low values of the corresponding characteristics of the constituent elements (mass per unit length of the strips of rovings: a few tens of g/m; mass per unit surface area of the fabrics: a few hundred g/m$^2$).

The resin impregnation level in the rovings and fabrics, together with the quality of the said resin, are chosen in accordance with the final characteristics required of the semi-finished product. For example, when using epoxy-type resins currently employed in the construction of aeronautical components subjected to high stresses, the impregnation is carried out to a level of about 20% by weight of resin. After polymerization, the semi-finished product then has a very good tensile strength, but it does not keep at ambient temperature and must be stored in a cold chamber.

To avoid this disadvantage, the impregnation is carried out with a latent resin. Because of its inherent characteristics, the impregnation level is greater, namely of the order of 30%. The semi-finished product thus obtained can be kept for several months at ambient temperature, but the mechanical strength of the components produced is not as high.

Figure 3:
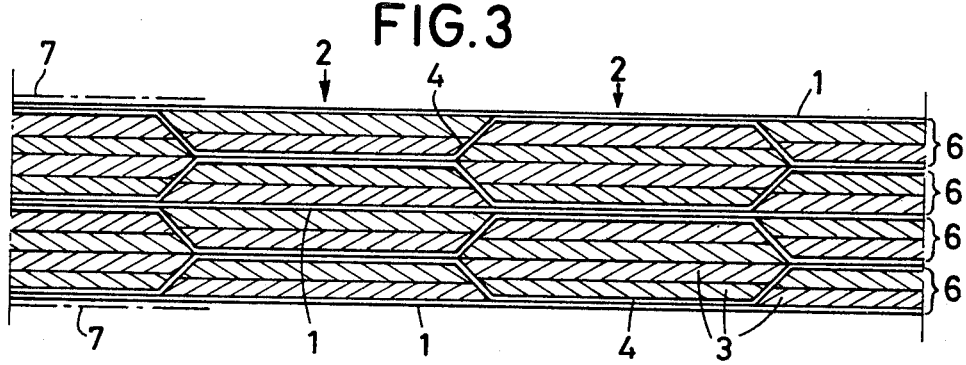

FIG. 3 shows a semi-finished product of more complicated structure; it is formed by the superposition of several layers 6, each of which corresponds to the embodiment of FIG. 2. Four layers 6 are stacked here; they are arranged so that their rows 2 coincide and so that the rippled webs of fabric 4 form channels of hexagonal cross-section, as shown in the figure, which leads to a structure with a cross-section reminiscent of a honeycomb. It will be noted that the central web of fabric 1 alone corresponds to the base webs of the two adjacent layers 6. As a variant, any intermediate plane web or fabric can be omitted from a structure of this type.

The fibers of the webs of fabric 1, 4 and of the strips of rovings 3 are mineral fibers, for example glass fibers, carbon fibers, boron fibers or Kevlar fibers. They are preimpregnated with polymerizable resin. When the semi-finished product is in the state suitable for use, this resin is normally unpolymerized or partially polymerized. The semi-finished product is in the form of a flexible and malleable sheet which can be folded and rolled up and whose somewhat sticky faces must be covered with protective sheets 7, for example made of polyethylene, which are removed when the semi-finished product is used.

The resin which impregnates the semi-finished product can also be completely polymerized. In such a case, the semi finished product is in the form of a rigid sheet comparable to a metal plate and not capable of being rolled up. More precisely, the semi-finished product is then marketed in the form of plane or corrugated metal plates, tubes or sections similar to the semi-finished products commonly used in metal construction, or in the form of covering sheets for panels having a sandwich structure.

Figure 4:
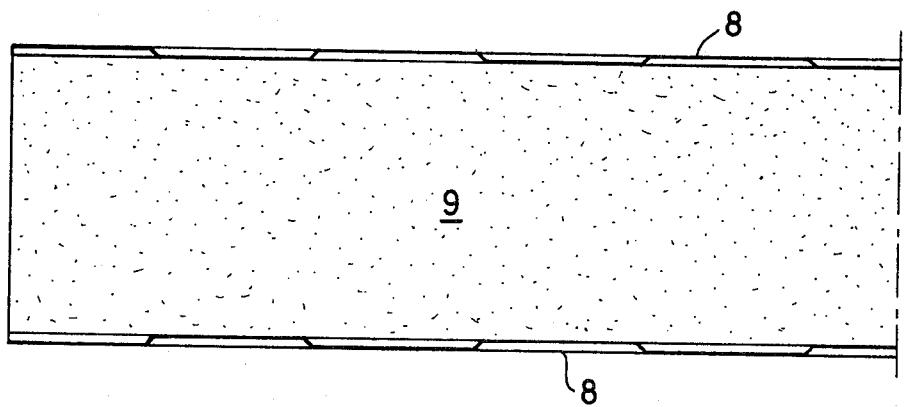
FIG. 4 shows the edge of a sandwich panel incorporating sheets of semi-finished product according to FIG. 2.

FIG. 4 shows an example of a sandwich panel comprising two covering sheets 8 consisting of a semi-finished product of the type in FIG. 2 (the type in FIG. 1 would also be suitable), provided with a complementary web 5, and a filler 9 consisting, for example, of a rigid plastic foam. A structure of this type can be reinforced on each face by a complementary web of fabric, which provides it with good rigidity. A reinforcing web of this type consists, for example, of a fabric of carbon fibers orientated at ±45° relative to the direction of the strips of rovings.

It has been found that a 30 mm wide band taken from a sheet of semi-finished product according to FIG. 2 (with a thickness equal to 2 mm) breaks at 7,100 daN when tensile-tested directly between the jaws of a machine. This corresponds to an average stress of about 120 hb and to a stress in the rovings of the order of 150 hb. The density of a product of this type is of the order of 2 t/m$^3$. Another band, taken in the transverse direction, breaks at an average stress of the order of 10 hb.

A structure produced by superposing several layers (FIG. 3) can withstand rupture of the fibers in tests in which a load is applied via a bore and a traversing pin; it imparts properties of resistance to delamination and resistance to the propagation of a tear.

The orientation of the fibers in each fabric comprising the semi-finished product, relative to the fibers in the other webs, is arbitrary. It is chosen so as to give the optimum result in each particular case.

What is claimed is:

1. A semi-finished product which is tacky to the touch and can be used to manufacture finished components, comprising:
   a first layer of fabric forming a base web lying in a plane and impregnated with polymerizable resin which is at most partially polymerized so that it is tacky to the touch;

a plurality of distinct strips of rovings impregnated with polymerizable resin which is at most partially polymerized so as to be tacky to the touch arranged in rows and juxtaposed on said fabric lying in the same longitudinal direction; and a second layer of fabric having a rippled configuration and passing alternately above and below the juxtaposed rows of said strips, said second layer being impregnated with polymerizable resin which is at most partially polymerized so as to be tacky to the touch.

2. A semi-finished product according to claim 1 wherein said second layer extends between said juxtaposed rows at an angle to a plane of said plane-based web, said semi-finished product including a further combined structure comprising a further first layer of fabric, a further plurality of strips of rovings formed into further juxtaposed rows and a further second layer of fabric having a ripple configuration and basing alternately above and below the further juxtaposed rows of strips, said structure being entirely impregnated with polymerizable resin which is at most partially polymerized, said structure connected to said first-mentioned plurality of strips and said first-mentioned second layer of fabric to form a hexagonal honeycomb structure with said first-mentioned and further second layer of fabric having said first-mentioned and further first layer of fabric on outer surfaces thereof.

3. A semi-finished product, according to claim 1, including a third layer of fabric lying in a plane spaced from the plane of said first layer of fabric and connected to said plurality of distinct strips and said second layer of fabric on an opposite side of said plurality of distinct strips and second layer from said first layer of fabric to form a symmetrical structure between said first and third layer of fabrics, said third layer of fabric being impregnated with polymerizable resin which is at most partly polymerized so that it is tacky to the touch.

4. A semi-finished product according to claim 3, wherein each of said plurality of distinct strips comprises a pair of superimposed strips lying within the rippled configuration of said second layer of fabric.

5. A semi-finished product of the kind comprising fiber layers preimpregnated with an unpolymerized polymerizable resin, and which is intended for the manufacture of components made of composite material, characterized in that it includes a plurality of superposed layers comprising each: a first web of base fabric, a plurality of rows of distinct strips of roving juxtaposed on said base fabric and oriented in one and the same longitudinal direction, a second web of base fabric arranged so as to form ripples by extending alternately below said rows of strips, in contact with said first web, and above said rows of strips in spaced relation with said first web, each of said rows comprising two superposed strips of rowing, said layers being relatively positioned so that the rippled webs of fabric from channels of hexagonal cross section, in a honeycomb-like fashion.

* * * * *